(12) United States Patent
Milder et al.

(10) Patent No.: US 8,459,248 B2
(45) Date of Patent: Jun. 11, 2013

(54) SOLAR FLUID HEATING AND COOLING SYSTEM

(75) Inventors: Fredric Milder, Galisteo, NM (US);
Boaz Soifer, Cerrillos, NM (US); Bristol Stickney, Tesuque, NM (US)

(73) Assignee: SolarLogic, LLC, Santa Fe, NM (US)

( * ) Notice: Subject to any disclaimer, the term of this patent is extended or adjusted under 35 U.S.C. 154(b) by 176 days.

(21) Appl. No.: 12/960,683

(22) Filed: Dec. 6, 2010

(65) Prior Publication Data
US 2011/0139148 A1 Jun. 16, 2011

(51) Int. Cl.
*F24J 2/04* (2006.01)
*F24J 2/05* (2006.01)
*F24J 2/24* (2006.01)

(52) U.S. Cl.
USPC ........... 126/589; 126/643; 126/570; 126/595; 126/634; 126/638; 52/173.3; 165/48.1; 165/58; 165/61; 165/128; 165/200; 237/8 C

(58) Field of Classification Search
CPC F24J 2/4625; F24J 2/4621; F24J 2/0494; F24J 2/32
USPC ................. 126/643, 570, 584, 585, 589, 594, 126/595, 634, 638, 639, 580; 237/8 C; 165/48.1, 48.2, 58, 61, 64, 128, 200, 201, 165/279, 287; 52/173.3; 244/172.7
IPC ........................ F24J 3/02, 2/04, 2/05, 2/24, 2/36
See application file for complete search history.

(56) References Cited

U.S. PATENT DOCUMENTS

| | | | | |
|---|---|---|---|---|
| 4,049,046 A | * | 9/1977 | Worthington | 165/48.2 |
| 4,102,325 A | * | 7/1978 | Cummings | 126/585 |
| 4,167,934 A | * | 9/1979 | Miles | 126/586 |
| 4,169,554 A | * | 10/1979 | Camp | 126/610 |
| 4,228,785 A | * | 10/1980 | Wagenseller | 126/591 |
| 4,270,517 A | | 6/1981 | Stephens | |
| 4,270,521 A | * | 6/1981 | Brekke | 126/563 |
| 4,286,650 A | * | 9/1981 | Lindner | 165/104.13 |
| 4,290,417 A | * | 9/1981 | Peters et al. | 126/638 |
| 4,305,380 A | * | 12/1981 | Allen | 126/601 |
| 4,309,148 A | * | 1/1982 | O'Hare | 417/18 |

(Continued)

FOREIGN PATENT DOCUMENTS

JP 60048429 A * 3/1985
JP 60057149 A * 4/1985

(Continued)

*Primary Examiner* — Steven B McAllister
*Assistant Examiner* — Daniel E Namay
(74) *Attorney, Agent, or Firm* — Christopher & Weisberg, P.A.

(57) ABSTRACT

A solar water heating and cooling system including a solar energy collection assembly having a heat absorbing element, a heat exchanger and a shield. The system also includes a cooling assembly, the cooling assembly is integral with the shield. The system has a check valve in fluid communication with the solar collection assembly and the cooling assembly, and a fluid pump in fluid communication with the solar energy collection assembly. A working fluid is disposed within the solar energy collection assembly, the cooling assembly, the check valve and the fluid pump. A cooling loop is defined by the solar energy collection assembly, the cooling assembly and the check valve. When the fluid pump is off, the working fluid circulates through the cooling loop, but when the fluid pump is on, the working fluid circulates through a heating loop that is defined by the solar energy collection assembly and the fluid pump.

19 Claims, 5 Drawing Sheets

U.S. PATENT DOCUMENTS

| | | | | |
|---|---|---|---|---|
| 4,320,743 A * | 3/1982 | Allen | | 126/646 |
| 4,344,414 A * | 8/1982 | Balch | | 126/638 |
| 4,351,161 A * | 9/1982 | Jones | | 62/235.1 |
| 4,366,807 A * | 1/1983 | Barber, Jr. | | 126/639 |
| 4,399,807 A | 8/1983 | Buckley et al. | | |
| 4,421,943 A * | 12/1983 | Withjack | | 136/246 |
| 4,446,852 A * | 5/1984 | Steigelmann | | 126/664 |
| 4,452,234 A * | 6/1984 | Withjack | | 126/627 |
| 4,473,063 A * | 9/1984 | Mackensen | | 126/591 |
| 4,505,262 A * | 3/1985 | Eaton | | 126/646 |
| 4,513,732 A * | 4/1985 | Feldman, Jr. | | 126/570 |
| 4,528,976 A | 7/1985 | Baer | | |
| 4,573,525 A * | 3/1986 | Boyd | | 165/104.22 |
| 4,607,688 A * | 8/1986 | Sorensen | | 165/104.22 |
| 4,611,654 A * | 9/1986 | Buchsel | | 165/104.22 |
| 4,691,692 A * | 9/1987 | Conner et al. | | 126/584 |
| 4,788,904 A * | 12/1988 | Radtke | | 454/164 |
| 4,790,477 A * | 12/1988 | Forkin et al. | | 237/2 B |
| 5,142,882 A * | 9/1992 | Vandenberg | | 62/235.1 |
| 5,195,575 A * | 3/1993 | Wylie | | 165/132 |
| 5,228,310 A * | 7/1993 | Vandenberg | | 62/235.1 |
| 5,644,841 A * | 7/1997 | Stewart et al. | | 29/890.046 |
| 5,685,152 A * | 11/1997 | Sterling | | 60/641.8 |
| 5,722,485 A * | 3/1998 | Love et al. | | 165/151 |
| 7,913,684 B2 * | 3/2011 | Butler | | 126/589 |
| 8,037,931 B2 * | 10/2011 | Penev et al. | | 165/201 |
| 2009/0133863 A1 * | 5/2009 | Ogawa et al. | | 165/182 |
| 2009/0199585 A1 * | 8/2009 | Ogawa et al. | | 62/324.2 |
| 2009/0293865 A1 * | 12/2009 | Pommerening | | 126/643 |
| 2010/0024804 A1 * | 2/2010 | Chiu et al. | | 126/640 |
| 2011/0155122 A1 * | 6/2011 | Piotrowski | | 126/625 |
| 2011/0162732 A1 * | 7/2011 | Biel | | 137/538 |

FOREIGN PATENT DOCUMENTS

| | | | | |
|---|---|---|---|---|
| JP | 60129563 A | * | 7/1985 | |
| JP | 02157548 A | * | 6/1990 | |
| JP | 2010190498 A | * | 9/2010 | |
| JP | 2011099665 A | * | 5/2011 | |

* cited by examiner

SOLAR FLUID HEATING AND COOLING SYSTEM

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to a method and system for active solar fluid heating and passive fluid cooling.

BACKGROUND OF THE INVENTION

Residential homes and businesses have recently started to re-embrace solar fluid heating technology as a cost efficient way of providing space heat and hot water within a building. Most solar heating systems have a closed looped structure that relies on a pump to drive fluid through a solar collector that absorbs heat from the sun. The solar collector transfers the absorbed heat to the fluid traveling within the collector. The heated fluid is transported to an external heat exchanger that operates to transfer heat from the fluid to another liquid, often water, flowing within the heat exchanger, thereby providing hot liquid to heat the interior spaces of the building or for personal or process use within the building.

While conventional systems use solar collectors to heat fluid in the presence of sunlight, interestingly, they are prone to overheating because they lack the ability to thermally cool fluid when the fluid reaches the maximum operating temperature of the system. In other words, too much solar energy collection may actually damage the system. This situation occurs in a number of common scenarios such as pump failure, lack of heat use in the residence/business, or power failure. During these situations, the fluid within the collector system continues to absorb heat and may surpass the maximum operating temperature of the system, causing the fluid to boil. Overheating typically leads to substantial cost in repairing or replacing the system. Even if the system continues to operate after overheating, the effect of overheated fluid can causes degradation of system performance. For example, boiling fluid leaves a residue in the solar collector that clogs the fluid pathways in the system, thereby inhibiting performance. Also, boiling fluid causes increased pressure and vibration that lead to leaks or breaks in the system piping. As such, the inability of solar fluid heating systems to cool overheated fluid negatively affects the durability of the system, often substantially cutting its service life.

Some solar fluid heating systems include an active cooling mechanism that allows overheated fluid to be cooled. However, these cooling mechanisms are active, meaning the system must positively actuate a means for cooling, such as driving cooler fluid into the overheated fluid, activating an electro-optic material so the solar collector reflects light instead of absorbing it, or electrically activating a three-way valve to divert flow to a cooling mechanism. Active cooling mechanisms are often bulky and more expensive owing to the extra equipment needed to actively cool. Moreover, these active cooling mechanisms require electricity to function and therefore are non-functional at the time of a power failure, precisely when there might be a need for preventing the collector system from overheating.

Attempts have been made to incorporate passive cooling mechanisms, but these systems rely on precise and complicated setup procedures in order to operate properly, and require precise levels of fluid to be present at different operating times in order for the cooling mechanism to operate properly. For example, fluid will flow into the cooling mechanism only if the fluid volume reaches a preset level, ideally corresponding to fluid being at a maximum desired temperature. However, if the system contains less than the ideal volume of fluid, the heated fluid may not reach the required fluid volume when the fluid temperature reaches a maximum operating temperature, i.e. no overheated fluid will flow into the cooling mechanism. Ensuring the proper level of fluid volume is present in the system requires setup by a professional and routine maintenance that are both costly to the average consumer. Therefore, there is a need for a solar fluid heating system incorporating passive cooling that allows for easy setup and maintenance so that the average consumer can setup and operate the system.

SUMMARY OF THE INVENTION

The present invention advantageously provides a solar fluid heating system that passively cools fluid. The system includes a solar energy collection assembly having a heat absorbing element, an internal heat exchanger and a shield. The system also includes a cooling assembly, the cooling assembly is integral with the shield. The system has a check valve in fluid communication with the solar collection assembly and the cooling assembly, and a fluid pump in fluid communication with the solar energy collection assembly. A working fluid is disposed within the solar energy collection assembly, the cooling assembly, the check valve and the fluid pump. A cooling loop is defined by the solar energy collection assembly, the cooling assembly and the check valve. When the fluid pump is off, the working fluid circulates through the cooling loop, but when the fluid pump is on, the working fluid circulates through a heating loop that includes the solar energy collection assembly and the fluid pump but not the cooling assembly.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
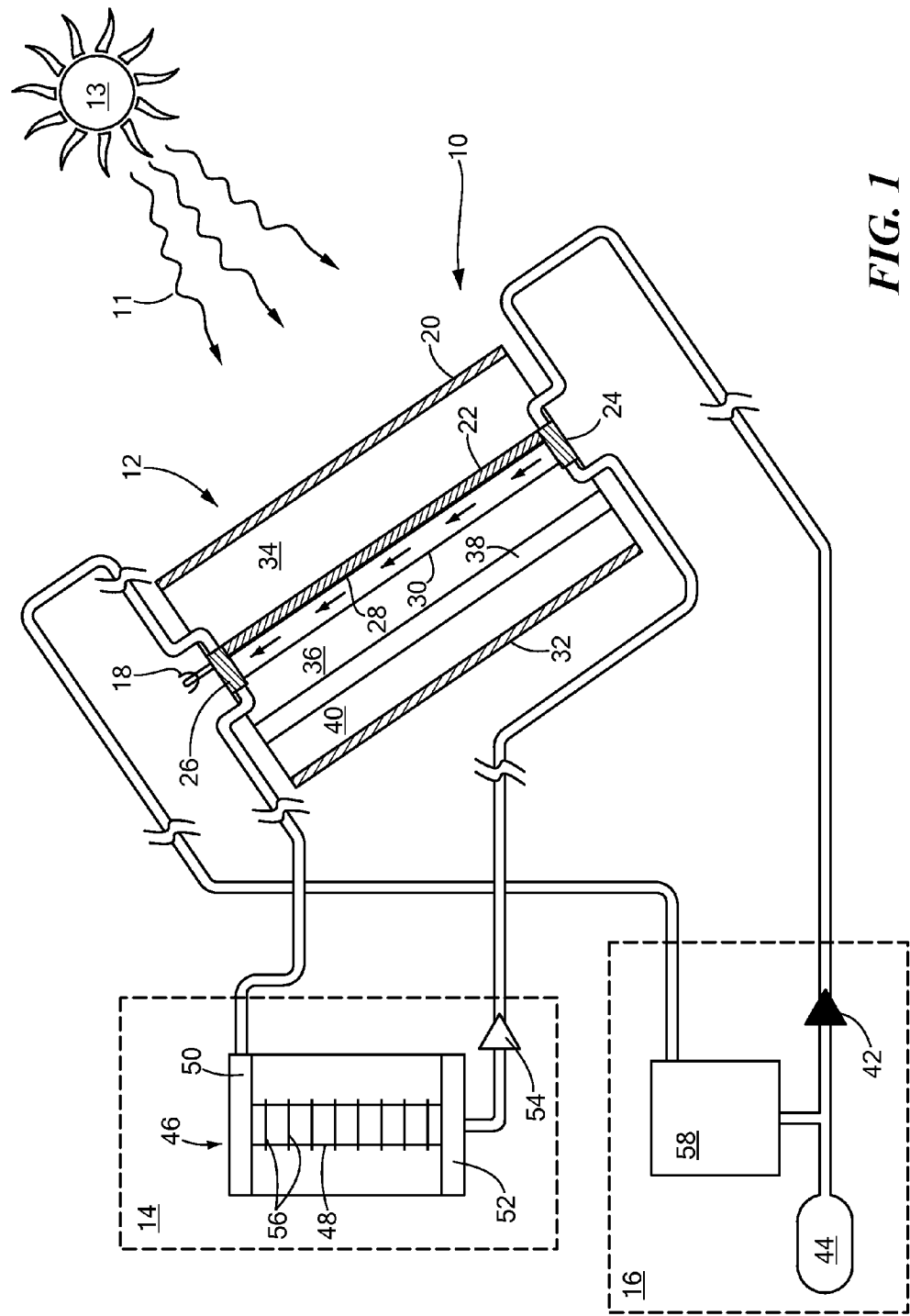
FIG. 1 illustrates a side view of the solar fluid heating and cooling system according to the invention.

The present invention advantageously provides a solar fluid heating system incorporating passive cooling that simplifies installation and operation of the system. Referring now to the drawing figures in which like reference designators refer to like elements there is shown in FIG. 1 a system constructed in accordance with the principles of the present invention and designated generally as "10." System 10 includes a solar energy collection assembly 12 that absorbs solar energy 11 from the sun 13 and transfers the absorbed solar energy to a working fluid circulating in the assembly 12. A cooling assembly 14 may also be included in the system 10 so that working fluid can be thermally cooled. The system 10 may further include a heat exchanging assembly 16 operable to control the heating and cooling functions of the system 10 and to transfer heat from the working fluid to the heat loads of the application through the external heat exchanger 58.

In particular, the solar energy collection assembly 12 ("collection assembly 12") may include a vent 18 in fluid communication with the heat exchanging assembly 16 and the cooling assembly 14. A working fluid may be dispensed directly into the vent 18 so as to fill the system 10 with working fluid, while the vent allows any air within the system 10 to escape. The vent 18 may include any opening capable of accepting working fluid, in which the opening may be extended from or flush with the collection assembly 12.

A face element 20 may be positioned on one face of the collection assembly 12. The face element 20 functions to allow solar energy to enter the collection assembly 12, while also helping isolate the interior of the collection assembly 12 from atmospheric conditions. The face element 20 may include a glass, plastic, cellophane, and the like, and may be transparent, translucent, any combination thereof or partially opaque. Furthermore, the face element may function as a lens or reflector for converging solar energy onto the heat absorbing element 22. A heat absorbing element 22 may be positioned substantially subjacent to the face element 20. The heat absorbing element 22 functions to absorb the solar energy passing through the face element 20. Also, the heat absorbing element 22 functions to transfer absorbed solar energy to an internal heat exchanger 28. The heat absorbing element 22 may include a plastic, metal, pigmented, coated, painted or any material capable of absorbing and transferring thermal energy. The heat absorbing element 22 may further be the same element as the internal heat exchanger element 28.

The collection assembly 12 may also include an inflow header channel 24 fluidly coupled to the heat exchanging assembly 16 and cooling assembly 14. The inflow header channel 24 may operate to guide working fluid into the collection assembly 12. An outflow header channel 26 may be included in the collection assembly 12 so as to guide working fluid towards the heat exchanging assembly 16 and/or the cooling assembly 14. The inflow and outflow header channels may be positioned at opposite ends of the collection assembly 12, and fluidly coupled to each other through at least one fluid conduit 30.

An internal heat exchanger 28 may be included in the collection assembly 12 and may serve to transfer the absorbed solar energy from the heat absorbing element 22 to at least one fluid conduit 30. The internal heat exchanger 28 may include thermally conductive material or may be the contact points between the heat absorbing element 22 and the at least one fluid conduit 30. The at least one fluid conduit 30 may operate to transfer working fluid through the collection assembly 12. Also, the at least one fluid conduit 30 may serve to transfer thermal energy from the internal heat exchanger 28 to the working fluid passing through the collection assembly 12. The at least one fluid conduit 30 may include a pipe, tube or the like, and may be composed of pvc, metal or any other material capable of containing fluid. Also, the at least one fluid conduit 30 may include a plurality of fluid conduits.

A shield 32 may also be included in the collection assembly 12. The shield 32 may be positioned substantially parallel to the face element 20 and on the opposite face of where the face element 20 is positioned in the collection assembly 12. While protecting the interior of the collection element from the environment, the shield 32 may also serve as an attachment surface for the cooling assembly 14. The shield 32 may include a plate, covering, and the like, and may be composed of metal, plastic, glass and the like, and may be solid, partially open or an open mesh.

The collection assembly 12 may also include several insulation layers and/or air spaces. A first insulation layer or air space 34 may be disposed between the heat absorbing element 22 and the face element 20. A second insulation layer or air space 36 may be positioned in between the at least one fluid conduit 30 and an insulation element 38. A third insulation layer or air space may be the insulation element 38, disposed between the second air space 36 and the shield 32. A fourth insulation layer or air space 40 may be disposed between the insulation element 38 and the shield 32. The insulation layers and/or air spaces may operate to thermally insulate the interior of the collection assembly 12 from atmospheric condition and may also serve to thermally insulate the heat absorbing element 22 and at least one fluid conduit 30 from the shield 32 and face element 20. The shield 32 may operate to separate and protect the interior elements of the collection assembly 12 from dust, dirt and other potentially damaging elements in the environment.

Referring to FIG. 1, the heat exchanging assembly 16 may include an external heat exchanging element 58 in fluid communication with the collection assembly 12. The external heat exchanging element 58 may operate to absorb thermal energy from a working fluid circulating through the system 10. The absorbed thermal energy may be transferred to secondary fluid, typically water, so as to heat the secondary fluid. The structure of heat exchanging element may include tubes, pipes, and the like, and the heat exchanging material may include metal or any other thermal material capable of containing fluid and transferring thermal energy.

The heat exchanging assembly 16 may also include a fluid pump 42 in fluid communication with the external heat exchanging element 58 and the collection assembly 12. The fluid pump 42 may function to drive fluid from the heat exchanging assembly 16 towards the collection assembly 12. The fluid pump 42 may include any device capable to driving fluid. An expansion tank 44 may also be included in the heat exchanging assembly 16, fluidly coupled to the fluid pump 42 and the external heat exchanging element 58. The expansion tank 44 may function to provide additional volume for fluid storage of heated working fluid. The expansion tank 44 may include a container, receptacle or any other vessel capable for providing additional volume for fluid storage.

Referring to FIG. 1, the cooling assembly 14 may include a cooling element 46 in fluid communication with the collection assembly 12. The cooling element 46 may function to thermally cool working fluid traveling within. The cooling element 46 may include a first header channel 50 and a second header channel 52 positioned at opposite ends of the cooling element 46. Both first and second header channels may be fluidly coupled to the collection assembly 12 and may include pipes, conduits or any other structure capable of creating a channel for holding fluid. At least one cooling conduit 48 may be fluidly coupled to the first header channel 50 and second header channel 52, so as to provide fluid communication between the first and second header channels. The at least one cooling conduit 48 may include a pipe, tube and the like, and may be composed of metal, plastic and the like. At least one thermal radiating appendage may be attached to the cooling conduit 48 so as to increase the thermal radiating surface area of the cooling conduit 48. The thermal radiating appendage may be composed of metal, plastic or any other material capable of absorbing and radiating thermal energy, and may include a radiating fin, plate, and the like, and may be flat or corrugated.

A check valve 54 may also be included in the cooling assembly 14 and may function to control the fluid flow from the cooling element 46 to collection assembly 12. The check valve 54 may include a one way pressure differential check valve or any device capable of allowing fluid to flow in one direction based on the pressure differential at the input and output ports of the device.

Figure 2:
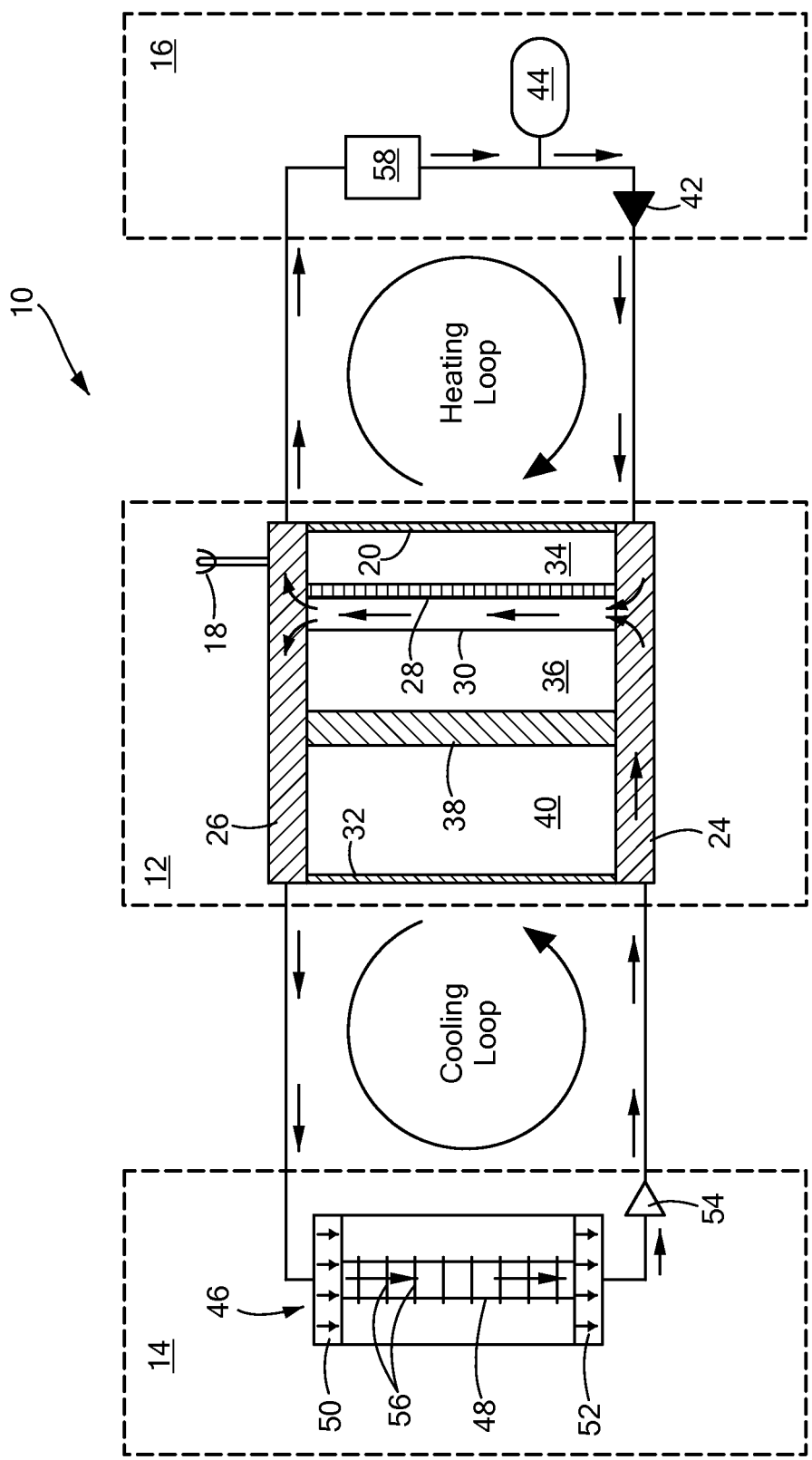
FIG. 2 illustrates a fluid flow schematic for the solar fluid heating and cooling system according to the invention.

In an exemplary method of operation, FIG. 2 illustrates a fluid flow diagram of the system 10 according to one embodiment of the invention. The fluid flow diagram indicates the direction of fluid flow through the system 10 during a pump "ON" state and a pump "OFF" state. The pump ON state indicates the fluid pump 42 is driving working fluid through the system 10, while the pump OFF state indicates substantially no fluid flow through the fluid pump 42.

Specifically, the direction of fluid flow may be dynamically configurable based on the operating state of the fluid pump 42, i.e. ON or OFF state. The operating state of the pump may cause circulation of fluid in one of two distinct fluid flow loops: a heating loop or a cooling loop. The heating loop serves to heat the working fluid and deliver the heated fluid to the heat exchanging assembly 16 and the cooling loop operates to cool the working fluid without delivering heated fluid to the heat exchanging assembly 16.

Referring to FIG. 2, the fluid pump 42 operating in the ON state causes the working fluid to circulate through the heating loop defined by fluid circulation through the collection assembly 12 and the heat exchanging assembly 16. In particular, as the fluid pump 42 drives working fluid toward the inflow header channel 24 of the collection assembly 12, the driven fluid causes pressure to build at the outflow section of the check valve 54. Since the system 10 is already filled with working fluid, the fluid present in the cooling element 46 and at the inflow port of the check valve 54 will create a pressure at the inflow port of the check valve 54. However, the pressure at the outflow section of the check valve 54 is enough to overcome the opposing pressure present at the inflow section of the check valve 54 due to the fluid flow through the at least one fluid conduit 30, thereby causing the check valve 54 to remain shut. Accordingly, the driven working fluid from the fluid pump 42 may flow through the collection assembly 12, absorbing thermal energy transferred from the at least one fluid conduit 30. The heated working fluid may then travel towards the outflow header channel 26.

Once in the outflow header channel 26, the working fluid may flow back towards the fluid pump 42 due to the lower pressure at the inflow port of the fluid pump 42 caused by the constant displacement of working fluid through the fluid pump 42. The working fluid may first travel through an external heat exchanging element 58 before reaching the fluid pump 42. The external heat exchanging element 58 may serve to transfer heat from the working fluid to another fluid, typically water, for general use by consumers. The heating loop may continue to circulate working fluid through the collection assembly 12 and the heat exchanging assembly 16 as long as the fluid pump 42 remains in an ON state, i.e. continues to drive fluid towards the inflow header channel 24 of the collection assembly 12.

Referring to FIG. 2, the fluid pump 42 in an OFF state may cause the working fluid to travel through the cooling loop defined by working fluid circulating through the collection assembly 12 and the cooling assembly 14. Working fluid may flow through the cooling loop because the pressure at the inflow port of the check valve 54 becomes greater than the pressure at the outflow port of the check valve 54, thereby opening the check valve 54. Specifically, turning OFF the fluid pump 42 significantly reduces the pressure at the outflow port of the check valve 54, i.e. the fluid pump 42 is no longer driving working fluid towards the inflow header channel 24 and the output port of the check valve 54; therefore, a thermo-siphoning process may occur, creating enough pressure at the inflow port of the check valve 54 to open the check valve 54.

Thermo-siphoning is a process that causes convective fluid movement by means of selective regions of fluid heating and cooling. Specifically, in a fluid loop, heated fluid becomes less dense than cooler fluid, causing the heated fluid to move upwards in the loop while cooler fluid sinks downward within the loop. The heated fluid moving upward in the loop will be replaced by cooler fluid at the bottom of the loop, thereby creating convective fluid movement. If the region where fluid is heated is separated from the region where fluid is cooled, then thermo-siphoning will create circular flow around the loop, with enough pressure differential to passively open a check valve.

Referring back to FIG. 2, thermo-siphoning may cause the cooler working fluid present in the cooling element 46 to sink towards the inflow port of the check valve 54. The heated working fluid present at the outflow port of the check valve 54 and in the collection assembly 12 may travel upward towards the outflow header channel 26. Since fluid flow through the turned OFF fluid pump 42 is substantially prevented, the heated working fluid may travel towards the cooling element 46 creating increased pressure at the input port of the check valve 54. Once the pressure at the inflow port of the check value overcomes the pressure at the outflow port of the check valve 54, the check valve 54 will open. Accordingly, working fluid may circulate through the cooling loop, thermally cooling the working fluid. The working fluid in the cooling loop may continue to circulate until the pressure at the inflow port of the check valve 54 is no longer greater than the pressure at the outflow port of the check valve 54, e.g. the pump is activated or the decrease in working fluid temperature causes thermo-siphoning to cease.

The system 10 may transition to and from the heating loop or cooling loop depending on needs of the system 10 and/or its user(s). For example, hot water may not be in high demand during the summer which is the period in the year when system 10 may be operating at peak heating performance. Therefore, the user will want to prevent damage to the system 10 from overheating fluid by transitioning the system 10 to circulate overheated fluid through the cooling loop by turning OFF the fluid pump. It should be understood by one of ordinary skill in the art that there may be an intermediate transition state to and from heating loop or cooling loop in which the thermal siphoning process that drives the fluid flow in the cooling loop may take some time to initiate. Also, the system 10 transitions to and from the heating or cooling loop may be initiated by automatic mechanical means that may include a solar power pump switch, temperature pump switch or any other mechanical switch capable of turning ON or OFF the fluid pump 42 based on a certain pump or fluid characteristics such as fluid pressure or available solar energy. Further, it should be noted that if the fluid pump 42 is OFF because of a lack of electrical power to it, as in a power failure or the like, then the system 10 self-transitions to the cooling loop without further intervention.

Figure 3:
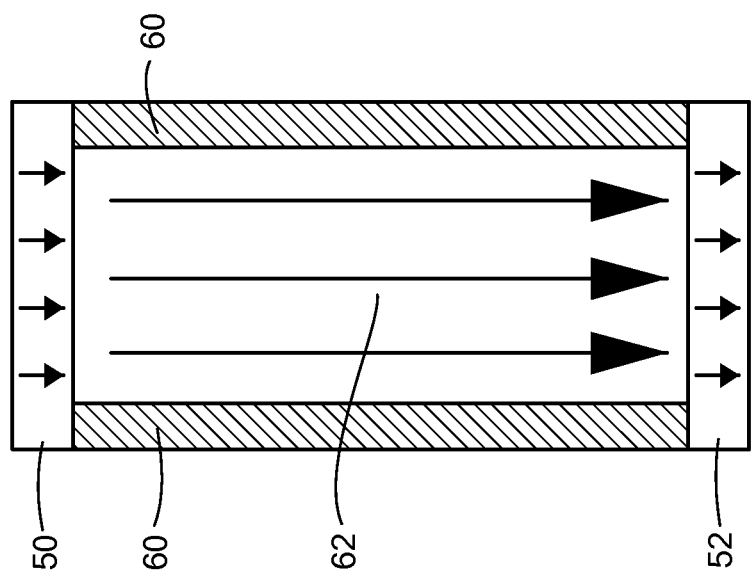
FIG. 3 illustrates a cross sectional view of a cooling element according to the invention.

Referring to FIG. 3, a cross sectional view of another embodiment of the cooling element is shown in which wetted plates 60 may be used to thermally cool the working fluid. In particular, wetted plates 60 may include thermal radiating plates that substantially encase a fluid channel 62 connecting the first and the second header channels. As working fluid travels through the cooling element 46, each thermal radiating plate absorbs thermal energy from the working fluid and emits the absorbed thermal energy into the atmosphere or into a thermal absorbing material. Wetted plates may serve to increase the heat absorbing and radiating surface areas of the cooling element 46, thus allowing for a substantial amount of heat to be transferred from the working fluid to the atmosphere.

Figure 4:
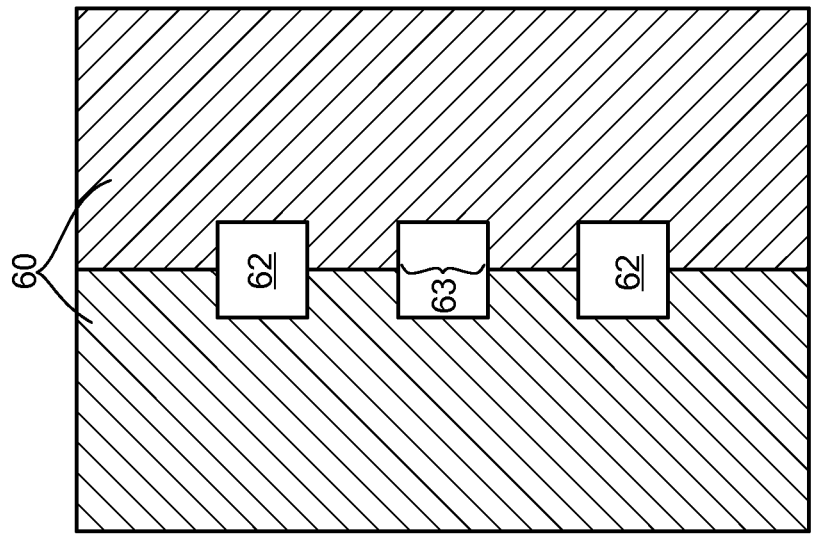
FIG. 4 illustrates a top view of an alternate cooling element according to the invention.

Referring to FIG. 4, a top view of another embodiment of the cooling element 46 is shown in which the wetted plates 60 may substantially enclose a plurality of fluid channels 62 that fluidly couple the first and second header channels (not shown). Each wetted plate 60 may have indentations 63 formed on one side so that placing the wetted plates 60 in contact with each other forms a plurality of fluid channels 62. Even though the fluid channels 62 are shown to be rectangular, one of ordinary skill in the art would recognize that the channel shape may include geometric and/or non-geometric shapes. Also, additional thermal absorbing materials may be inserted into the fluid channels 62 to increase heat transfer to the wetted plates 60 and to further enhance the fluid holding properties of the channels 62, e.g. prevent leaks between fluid channels 62 or between a fluid channel and the exterior environment.

Figure 5A:
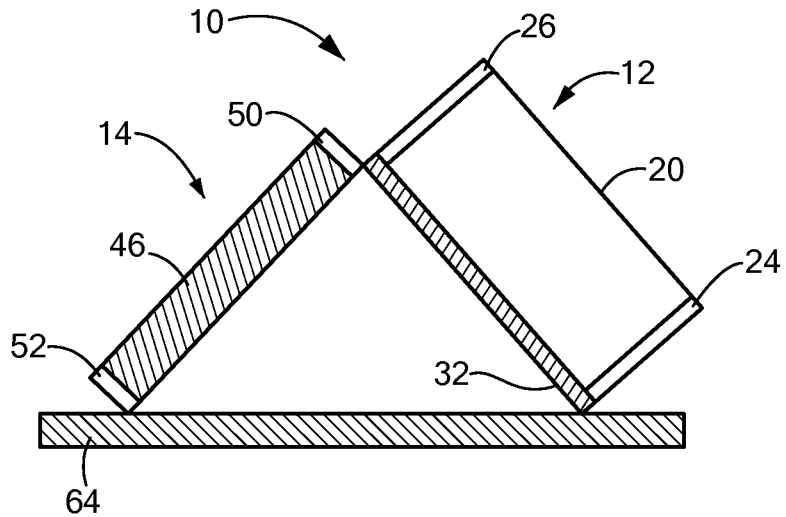
FIGS. 5A-C illustrate side views of the solar fluid heating and cooling system according to the invention.

Referring to FIG. 5A, the system 10 may include the cooling assembly 14 hinged to one end of the collection element 12. For example, the hinge may be connected about the first header channel 50 of the cooling element 46 and about the outflow header channel 26 of the collection element 12. The pivot ability feature enables the system 10 to be configured in many different ways according to the user's needs.

For example, if mounting the system 10 on a roof, a user may want to utilize the most compact form of the system 10 that means the cooling assembly 14 may be kept flush with the shield 32. However, if a user wants to mount the system 10 away from the house, hidden from view, the user may employ the configuration shown in FIG. 5A, in which the system 10 is able to support itself upright. Furthermore, an additional base support structure 64 may be attached to one end of the cooling assembly 14 and to one end of the collection assembly 12. For example, the additional base support structure 64 may be attached near the second header channel 52 of the cooling assembly 14 and near the inflow header channel 24 of the collection assembly 12. The attachment mechanism of the additional support structure 64 may include a locking mechanism to secure the system 10 in one position, a sliding mechanism or any other mechanism that allows the angle between the cooling element and the collection assembly 12 to be reconfigurable.

Figure 5B:
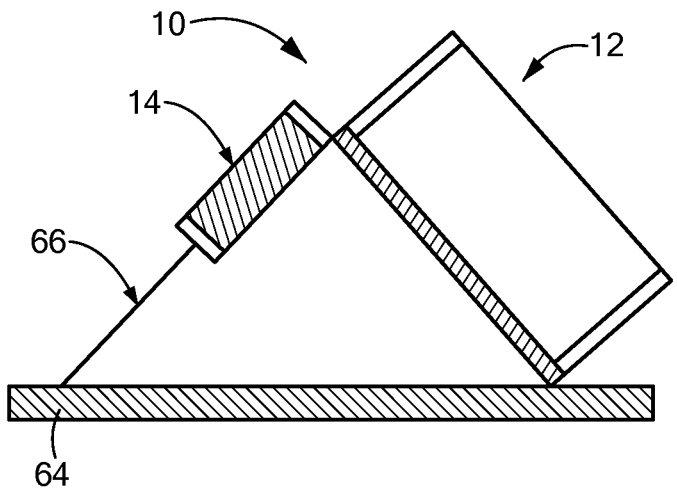

Referring to FIG. 5B, the system 10 may include a shortened cooling assembly 14 hinged to one end of the collection element 12 and an additional support structure in the form of extendable leg(s) 66 that allow for further configurations according to the user's needs.

Figure 5C:
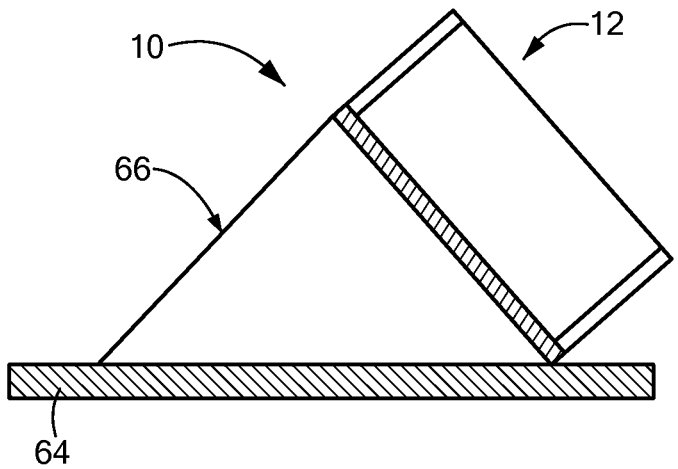

Referring to FIG. 5C, the collection element 12 may include the additional support structure in the form of extendable leg(s) 66 themselves hinged to one end of the collection assembly. The cooling assembly 14 (not shown) may be reconfigured as shown in FIGS. 6A-C.

Figure 6A:
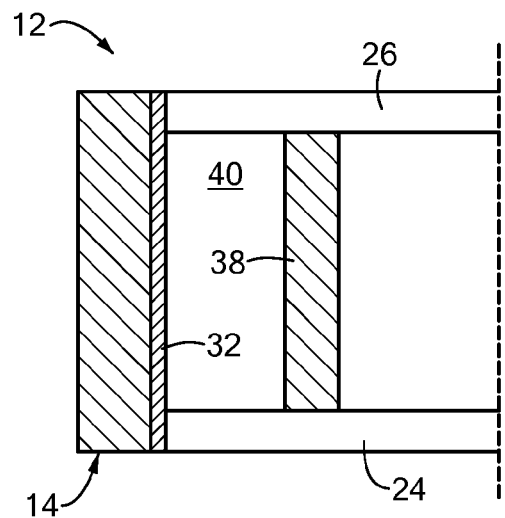
FIGS. 6A-C illustrate partial side views of the solar fluid heating and cooling system with an integral cooling assembly according to the invention.

Referring to FIG. 6A, the cooling assembly 14 may be built onto or into the collection assembly 12. For example, the cooling assembly 14 may be built onto the shield 32. The advantages of placing the cooling assembly 14 integral with the shield 32 are to reduce the size of the system, which increases the aesthetic appeal of the system while lower manufacturing cost.

Figure 6B:
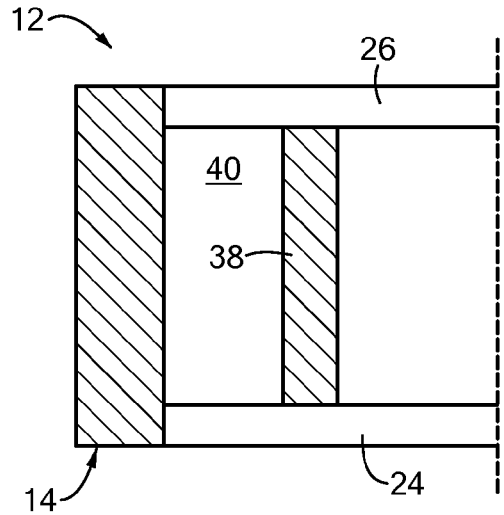

Referring to FIG. 6B, in another example, the shield 32 may be replaced by a cooling assembly 14 that also provides the same functions as the shield 32, i.e. isolates the components of the collection assembly 12 from the environment, etc.

Figure 6C:
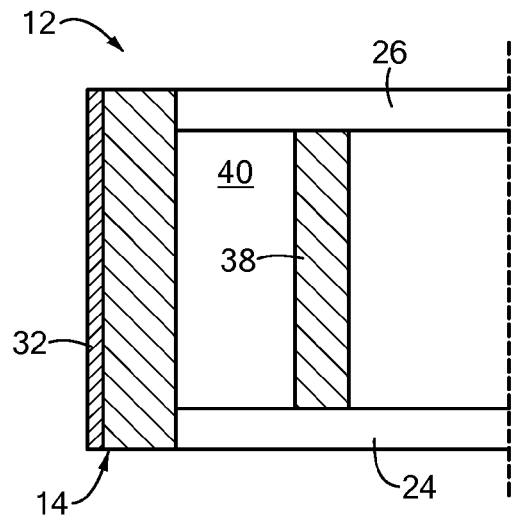

Referring to FIG. 6C, in yet another example, the shield 32 may be positioned outside of the cooling assembly 14 so as to protect the various components of the cooling assembly which may themselves be damageable, etc. The variety of configurations may be tailored to the user's needs or space requirements.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A solar fluid heating and cooling system comprising:
a solar energy collection assembly having a heat absorbing element, a heat exchanger and a shield;
a cooling assembly integral with the shield and in fluid communication with the solar energy collection assembly;
a closed cooling loop defined by the solar energy collection assembly and the cooling assembly; and
a pressure differential check valve in fluid communication with the cooling loop, the check valve being selectively operable to control fluid flow in the cooling loop, the check valve controlling fluid flow into the solar energy collection assembly from the cooling loop, the check valve enabling the fluid flow to flow around the cooling loop in a single direction.

2. The solar fluid heating and cooling system of claim 1, wherein the fluid is a liquid.

3. The solar fluid heating and cooling system of claim 1, wherein the cooling loop has a fluid pressure that remains at a positive pressure relative to atmospheric pressure at all times during both heating and cooling.

4. The solar fluid heating and cooling system of claim 1, further comprising the cooling assembly having of a plurality of thermal radiating elements.

5. The solar fluid heating and cooling system of claim 4, wherein the plurality of thermal radiating elements are a plurality of thermal radiating plates.

6. The solar fluid heating and cooling system of claim 4, wherein the plurality of thermal radiating elements are thermal radiating appendages.

7. The solar fluid heating and cooling system of claim 1, wherein the cooling assembly is pivotable about the solar energy collection assembly.

8. A solar fluid heating and cooling system comprising:
a solar energy collection assembly having a heat absorbing element, a heat exchanger and a shield;
a cooling assembly in fluid communication with the solar energy collection assembly;

a fluid pump selectively operable to control fluid flow in the cooling assembly;

a working fluid disposed within the solar energy collection assembly, the cooling assembly and the fluid pump;

when the fluid pump is on, the working fluid does not circulate in the cooling assembly; and when the fluid pump is off, the working fluid circulates around the cooling assembly in a single direction defining a closed loop.

9. The solar fluid heating and cooling system of claim 8, wherein when the fluid pump is off, a thermo-siphoning fluid flow circulates through the solar energy collection assembly and the cooling assembly.

10. The solar fluid heating and cooling system of claim 8, further comprising a pressure differential check valve in fluid communication with the solar energy collection assembly and the cooling assembly.

11. The solar fluid heating and cooling system of claim 10, wherein when the fluid pump is on, the working fluid does not flow through the check valve.

12. The solar fluid heating and cooling system of claim 11, wherein when the fluid pump is off, the working fluid is flowable through the check valve.

13. A solar fluid heating and cooling system comprising:
a solar energy collection assembly having a heat absorbing element, a heat exchanger and a shield;
a cooling assembly, the cooling assembly is integral with the shield;
a check valve in fluid communication with the solar collection assembly and the cooling assembly;
a fluid pump in fluid communication with the solar energy collection assembly;
a working fluid disposed within the solar energy collection assembly, the cooling assembly, the check valve and the fluid pump; and
a closed cooling loop defined by the solar energy collection assembly, the cooling assembly and the check valve;
when the fluid pump is off, the working fluid circulates around the cooling loop in a single direction;
a heating loop defined by the solar energy collection assembly and the fluid pump; and
when the fluid pump is on, the working fluid circulates through the heating loop.

14. The solar fluid heating and cooling system of claim 13, wherein the check valve is a pressure differential check valve.

15. The solar fluid heating and cooling system of claim 14, wherein when the fluid pump is off, a thermo-siphoning fluid flow circulates through the solar energy collection assembly, the cooling assembly and the check valve.

16. The solar fluid heating and cooling system of claim 15, wherein the cooling assembly is pivotable about the solar energy collection assembly.

17. The solar fluid heating and cooling system of claim 16, further comprising a fluid pressure of the cooling loop remaining at a positive pressure during cooling of the working fluid.

18. The solar fluid heating and cooling system of claim 17, wherein the cooling assembly includes at least two thermal radiating plates that form at least one fluid channel.

19. The solar fluid heating and cooling system of claim 18, wherein the at least two thermal radiating plates each have at least two indentations, the at least two indentations forming a plurality of fluid channels.

* * * * *